United States Patent [19]
Stadler et al.

[11] Patent Number: 6,026,074
[45] Date of Patent: Feb. 15, 2000

[54] METHOD FOR SYNCHRONIZING TRANSMISSIONS AT A CONSTANT BIT RATE IN ATM NETWORKS AND CIRCUIT ARRANGEMENTS FOR CARRYING OUT THE METHOD

[75] Inventors: Bruno Stadler, Berlin; Olaf Krause, Apolda, both of Germany

[73] Assignee: Krone AG, Germany

[21] Appl. No.: 08/916,655

[22] Filed: Aug. 22, 1997

[30] Foreign Application Priority Data

Oct. 24, 1996 [DE] Germany .............. 196 44 238

[51] Int. Cl.$^7$ .............. G08C 15/00; H04L 12/28; H04J 3/06
[52] U.S. Cl. .............. 370/230; 370/252; 370/253; 370/395; 370/503
[58] Field of Search .............. 370/230, 231, 370/232, 252, 253, 395, 392, 394, 503, 516, 517, 428, 429; 714/704, 707

[56] References Cited

FOREIGN PATENT DOCUMENTS 0 485 971 A2  5/1992  European Pat. Off. .
0 622 918 A2  4/1993  European Pat. Off. .
WO 95/14337  5/1995  WIPO .

OTHER PUBLICATIONS

Jul. 1994, Proposal of Mechanism for Source Clock . . . , *IBM Technical Disclosure Bulletin* vol. 37, No. 7.

*Primary Examiner*—Alpus H. Hsu
*Assistant Examiner*—Afsar M. Qureshi
*Attorney, Agent, or Firm*—McGlew and Tuttle, P.C.

[57] ABSTRACT

The invention relates to a method for synchronizing transmissions at a constant bit rate in ATM networks and circuit arrangements for carrying out the method, in which a time stamp $T_S$ is fed to the ATM cells which have been input on the receiver side, the data is output in a delayed fashion, the actual delay time $(T_A-T_S)$ is compared with a prescribed desired value $t_V$, and a correcting variable, which adjusts the clock frequency of a time base (14) counter to the error variable, is generated by a controller (13) on the basis of the error variable $t_R = t_V - (T_A - T_S)$.

6 Claims, 2 Drawing Sheets

//METHOD FOR SYNCHRONIZING TRANSMISSIONS AT A CONSTANT BIT RATE IN ATM NETWORKS AND CIRCUIT ARRANGEMENTS FOR CARRYING OUT THE METHOD

FIELD OF THE INVENTION

The invention relates to a method for synchronizing transmissions at a constant bit rate in ATM networks and circuit arrangements for carrying out the method.

BACKGROUND OF THE INVENTION

In the case of CBR (Constant Bit Rate) transmissions, a uniform system clock is required throughout the network. For this purpose, a hierarchy is established on the basis of the generation of a central system clock. One of the sides communicating functions as master in respect of the clock, and the other side functions as slave. In the case of a transmission in STM (Synchronous Transfer Mode) systems, the receiver of the slave can recover the clock from the received signal and synchronize the processing of the receiving signal and its own transmitter with this clock. In telecommunications systems, the respectively higher network level is generally master in respect of the lower network level. In the subscriber area, basically the network is the master and the subscriber side is the slave.

CBR transmissions in ATM (Asynchronous Transfer Mode) networks specifically require measures for achieving synchronization between source and sink. This situation occurs for example when voice and video transmissions are made over ATM networks. In the case of transmissions in ATM it is not possible to recover a clock from the received signal. Without specific measures for achieving synchronization of the device to be defined as slave, more malfunctions would occur because of the unavoidable frequency deviation of independent systems. In the case of an excessively low clock frequency of the slave, data congestion occurs in its receiver and a "hole in the data" occurs in the receiver of the master. In the case of an excessively high clock frequency of the slave, a "hole in the data', occurs in its receiver and "data congestion" occurs in the receiver of the master. Various methods are known for ensuring fault-free CBR transmissions in ATM networks and they are standardized in "I-ETS 300 353 Broadband Integrated Services Digital Network (B-ISDN) Asynchronous Transfer Mode (ATM) Adaptation Layer (AA2) specification type 1".

All known methods have in common that an interworking unit, which has an input for the CBR data stream, is arranged on the transmit side (segmentation) of the master. The interworking unit generates ATM cells by segmentation of the CBR data stream according to AAL1, in accordance with I-ETS 300 353 B-ISDN. The generated ATM cells are output onto a real transmission channel via an output of the interworking unit. The real transmission channel is understood to be the totality of all the transmission link components, converters, multiplexers, switching devices, cross connects, etc. which have to be matched to the transmission path to the receiver of the slave. Because of the asynchronous transmission method, the delay time over the real transmission channel is not constant but rather fluctuates about an average time (DTV—Delay Time Variation). The quasi-constant cell rate at the output of the interworking unit of the master is thus subject to greater or lesser fluctuations at the end of the real transmission channel. For this reason, the reception devices always have an input buffer. The size of the input buffer is to be dimensioned as a function of the expected DTV of the real transmission channel, in such a way that the buffer does not overflow even when there is a minimum interval between arriving cells and there is no idle operation of the input buffer when there is a maximum interval between arriving cells when continuous interrogation, in synchronism with the source clock, takes place at the output of the input buffer. The receive side (reassembling) of an interworking unit is connected to the output of the input buffer. A CBR data stream is reassembled from the ATM cells by the interworking unit according to AAL1 in accordance with I-ETS 300 358 B-ISDN. A clock generated by a time base is fed via a further input to the interworking unit on the receiver side. This clock determines the data rate of the CBR data stream which is made available at the output of the inlerworking unit.

In the known SRTS (Synchronous Residual Time-Stamp) method, an SRTS generator, to which the system clock is fed via an input, is arranged on the master side. The SRTS generator generates a time stamp from the system clock, the residue RTS (Residual Time Stamp) of which is fed via an output to an additional input of the interworking unit of the master. The interworking unit of the master inserts the RTS into the AAL1 overhead of the generated ATM cells. The generation and insertion of the RTS are standardized in I-ETS 300 3S3 B-ISDN. The RTS is the deviation from an expected value which unambiguously describes this deviation with 4 bits (1 bit sign, 3 bits value). Since it is a precondition that the expected value is known to the receiver as "a priori information", the latter can regenerate the time stamp again. From the comparison with the receiver's own time base, an adjustment variable for the time base of the receiver can be derived from this. To this end, an SRTS generator, to which the clock of the time base is fed via an input, is arranged on the receive side, for example. The SRTS generator generates, similarly to the SRTS generator on the master side, the corresponding RTS, which is fed to an input of a desired/actual value comparison, from the freewheeling clock of the time base. The second input of the desired/actual value comparison is connected to an additional output of the interworking unit on the receiver side. The interworking unit on the receiver side extracts the RTS of the master side from the received ATM cells and feeds this RTS to the second input of the desired/actual value comparator. The desired/actual value comparator derives from the comparison of the two input signals an error variable which is fed to a controller. The controller generates from the error variable a correcting variable, which is transferred to the time base so that the time base adjusts its clock in accordance with the correcting variable. A detailed description can be found in "ATM Networks, 3rd edition, pp. 179 et seq; Othmar Kyas, DATACOM Publishing House". The disadvantage of this known method is that both the master side and the receiver side have to be modified in terms of hardware and/or software, which makes the described method very costly.

Furthermore, the ACR (Adaptive Clock Recovery) method, which does not require modification on the master side, is known from I-ETS 300 353 B-ISDN. To this end, the input buffer has an additional output on the receiver side. A control signal, which indicates whether the input buffer is more than half filled is present at this additional output. This control signal is transferred to the input of a controller. The controller generates a correcting variable, which is fed to the time base, from the control signal. The time base then adjusts the clock in accordance with the correcting variable. A disadvantage with this method is that a number of cells in the input buffer have to be occupied and this buffering has an effect on the transmission in the form of a delay time. In the case of a transmission at 64 kbits/s, this means an additional delay of 6 ms per cell.

SUMMARY AND OBJECTS OF THE INVENTION

The invention is therefore based on the object of providing a method for synchronizing transmissions at a constant bit rate in ATM networks and circuit arrangements for carrying out the method, in which short delay times occur with minor modifications in terms of hardware or software.

According to the invention, the transmitted ATM cells are stored on the receive side in their input buffer on reception, the ATM cells are assigned a time stamp $T_S$ which correlates with the time of reception. The data stored in the ATM cells are output with a time delay with respect to the reception time, starting at the time $T_A$. At the start of the outputting of data, the delay time $(T_A-T_S)$ is sensed and compared with a prescribed desired value time $t_V$. From the difference, an error variable $t_R$ is generated and from this the controller generates a correcting variable which adjusts the clock frequency of the time base counter to the deviation. As a result, a receive-side synchronization is achieved which does not require any modification of the transmitter side in terms of software or hardware. Moreover, the prescribed desired value for the delay time can be selected to be very small, since its minimum value is limited only by the variation of the transmission times DTV of the ATM cells.

The controller may be designed as an integrating controller. The controller derives the sign value from the error variable $t_R$ and adjusts the clock frequency of the time base in accordance with $\Delta f=-k\Sigma(SIG_{TA(i)})$.

The invention also comprises a receiver station for ATM networks with an input buffer, an interworking unit, a time base, a desired/actual value comparator and a controller, in which station an output of the input buffer is connected to an input of the interworking unit. An output of the interworking unit is connected to an input of the desired/actual value comparator, an output of the desired/actual value comparator is connected to an input of the controller, an output of the controller is connected to an input of the time base and an output of the time base is connected to an input of the interworking unit. A further output of the time base is connected to an input of the input buffer and a further output of the time base is connected to an input of the desired/actual value comparator.

The invention is explained in more detail below with reference to a preferred exemplary embodiment.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
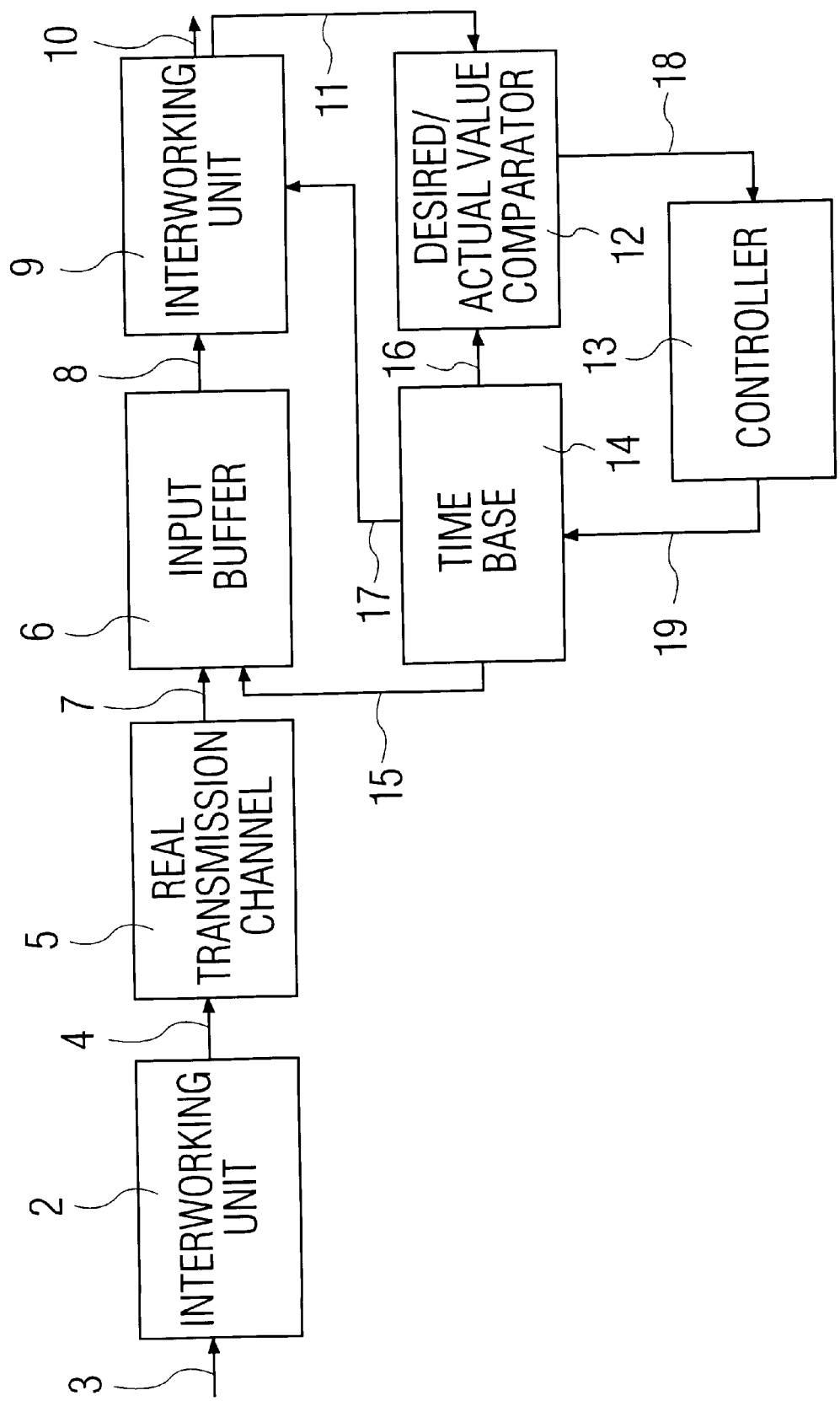
FIG. 1 is a schematic block circuit diagram of an ATM network.

Referring to the drawings in particular, the invention comprises a method for synchronizing transmissions at a constant bit rate in ATM networks and circuit arrangements for carrying out the method. The ATM network 1 comprises an interworking unit 2 with an input 3 and an output 4 for the transmit direction, only the transmit direction being illustrated in the block circuit diagram. The CBR data stream to be transmitted is transferred to the interworking unit 2 via the input 3. ATM cells are generated by the interworking unit 2 by segmentation of the CBR data stream in accordance with AAL1. The generated ATM cells are transferred to a real transmission channel 5 via the output 4. The real transmission channel 5 constitutes the sum of all the transmission link components as far as the receiver. The receiver side of the ATM network 1 comprises an input buffer 6 with an input 7 and an output 8, an interworking unit 9 with a data output 10 and a signal output 11, a desired/actual value comparator 12, a controller 13 and a time base 14. The ATM cells transmitted via the real transmission channel 5 then pass via the input 7 into the input buffer 6 where they are stored. At the reception of the ATM cells at the input buffer 6, the ATM cells are each assigned a time stamp $T_S$ which correlates with the time of the reception. This takes place by means of a connection 15 between an additional output of the time base 14 and an additional input of the input buffer 6. Since this time stamp $T_S$ does not have to be inserted at the ATM position which has been input, but rather only has to be assigned to it, and the time stamp does not have to be transmitted from the transmitter to the receiver, the need for costly compressions (for example residue—RTS) can be avoided. The time base 14 has a further output which is connected via a connection 16 to an input of the desired/actual value comparator 12 and via which the current time information $T_A$ is continuously transmitted. If the ATM cells are transferred from the input buffer 6 to the interworking unit 9, the CBR data stream is reassembled again, a desired value $t_V$ being prescribed for the delay time between the reception of an ATM cell up to the start of the outputting in the CBR data stream. The actual delay time is dependent on the fluctuations of the transmission time from the transmitter to the receiver and on the clock frequency at which the CBR data stream is output. This clock frequency is fed to the interworking unit 9 from the time base 14 via a connection 17. Via the signal output 11, the time stamp $T_S$ of a reassembled ATM cell is output and fed to the other input of the desired/actual value comparator 12. The desired/actual value comparator 12 derives an error variable $t_R$ from the comparison of the difference between the two input signals $T_A$ and $T_S$ and the prescribed desired value of the delay time $t_V$. The error variable $t_R$ is transferred from the output of the desired/actual value comparator 12 to an input of the controller 13 via a connection 18. The controller 13 generates from the error variable $t_R$ a correcting variable which is transferred from the output of the controller 13 to an input of the time base 14 via a connection 19. The transferred correcting variable adjusts the clock frequency of the time base 14 counter to the error variable $t_R$.

Figure 2:
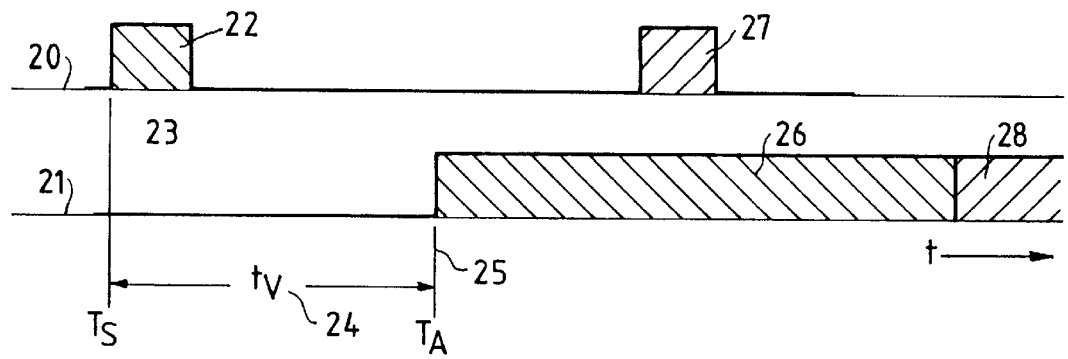
FIG. 2 is a timing diagram of the starting situation.

FIG. 2 illustrates the starting situation, i.e. the reception and the outputting of a first ATM cell. The time axis 20 represents the timing diagram at the input 7 of the input buffer 6. The time axis 21 represents the timing diagram at the output of the interworking unit 9. The first incoming ATM cell 22 is provided with a time stamp $T_S$ 23. The interworking unit 9 receives this first ATM cell 22 and delays the start of the outputting by the delay time $t_V$ 24 up to the time $T_A$ 25. The error variable $t_R=t_V-(T_A-T_S)=0$ is thus determined for this starting situation by the desired/actual value comparator 12. This value is transferred to the controller 13 which accordingly does not output any correcting variable to the time base 14. The data of the first ATM cell 22 which has been output is therefore output at the data output 10 of the interworking unit 9 with the still uncontrolled clock of the time base 14 as data stream section 26. The data of an ATM cell 27 which has subsequently been input is added, without interruption, to the data stream section of the first ATM cell 22 as data stream section 28.

Figure 3:
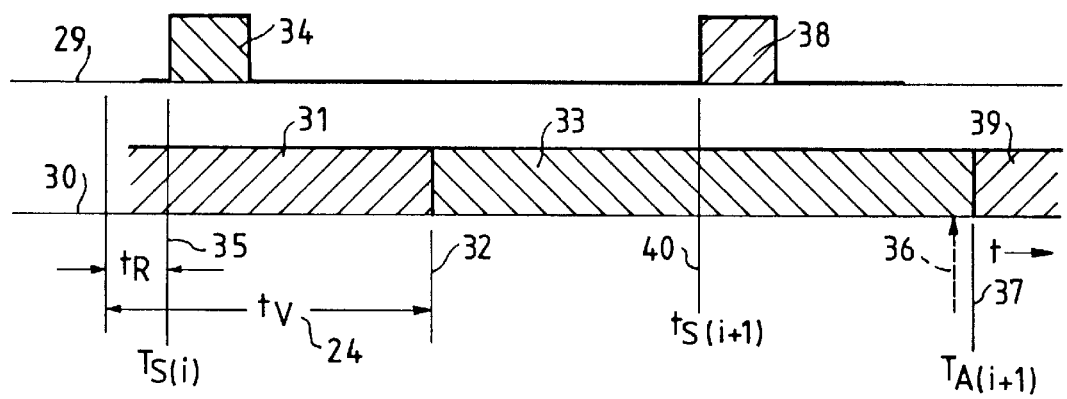
FIG. 3 is a timing diagram of an operating state.

The operational situation, i.e. reception and outputting of ATM cells after the starting situation, and the associated control mechanism, are illustrated in FIG. 3. The time axis 29 represents the timing diagram at the input 7 of the input buffer 6. The time axis 30 represents the timing diagram at the output of the interworking unit 9. The interworking unit 9 terminates the outputting of the data 31 of a cell (i-1) (not illustrated) at the time $T_{A(i)}$32 and starts the outputting of the data 33 of the next incoming ATM cell (i) 34 which is ready in the input buffer 6 and has the time stamp $T_{S(i)}$35. The time stamp $T_{S(i)}$35 is transferred from the interworking unit 9 to the desired/actual value comparator 12. The desired/actual value comparator 12 compares the difference between the time stamp $T_{S(i)}$35 and the current time $T_{A(i)}$32, which difference is continuously made available by the time base 14 via the connection 16, with the permanently prescribed delay time $t_V$ 24. The error variable where $t_R=t_V-(T_A-T_S)\neq 0$ is determined from this. The error variable $t_R$ is transferred via the connection 18 to the controller 13 which derives from it a correcting variable which is transferred via the connection 19 to the time base, and the clock frequency of the time base 14 is corrected.

FIG. 3 illustrates the case in which, as a result of the delayed inputting of the ATM cell 34 or an excessively high clock rate of the time base 14 at its output, the interval $(T_A-T_S)$ has become $\leq t_V$ and thus the error variable $t_R$ has assumed a positive value. The described control procedure is therefore set in such a way that, in this case, it leads to a reduction in the clock frequency of the time base 14 at its output. If the data of the ATM position 34 of the ATM cell 34 were to be output as data section 33 in the data stream at the data output 10 of the interworking unit without this control, the outputting would be terminated at the time 36. As a result of the effects of the control, displacement to the time $T_{A(i+1)}$37 takes place. The entire procedure is now continuously repeated in the same way for the outputting of the next ATM cell 38 as data section 39 at the data output 10 of the interworking unit 9, a time stamp $T_{S(i+1)}$40 being assigned to the new ATM cell 38.

Figure 4:
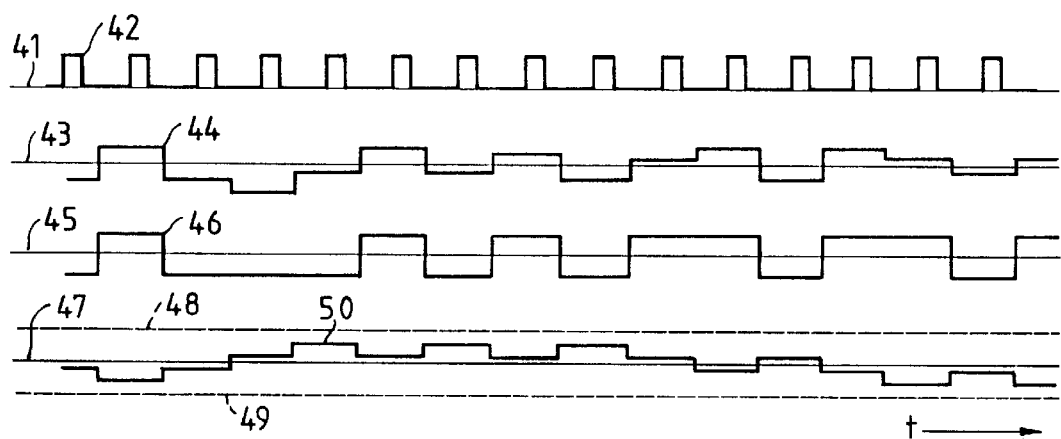
FIG. 4 is a timing diagram of the control.

An embodiment of the control circuit, which is based on an integrating controller, is illustrated in FIG. 4. The timing diagram 41 at the input of the input buffer 6 is illustrated. The incoming ATM cells 42 are illustrated, the illustration of the different intervals between the ATM cells 42 owing to the DTV having been dispensed with. The timing diagram 43 represents the error variable $t_R$ 44, as it is determined by the desired/actual value comparator 12 at the respective times $T_{A(i)}$ and is transferred to the controller 13. The timing diagram 45 represents the sign curve 46 which is derived in the controller from the timing diagram 43 of the error variable $t_R$ 44. The timing diagram 47 represents the clock frequency at the output of the time base 14. Also illustrated are the magnitude of the desired frequency, which is identical to the time axis of the timing diagram 47, the permitted maximum value 48, the permitted minimum value 49 and the actual value profile 50 affected by the control. The actual value profile 50 is the integral of the sign curve 46 in that the clock frequency at the output of the time base 14 is increased by one step at each time $T_{A(i)}$ by the controller 13 via the connection 19 using a correction signal if the sign curve has a value of -1, or is decreased by one step if the sign curve 46 has a value of 1. The magnitude of the steps by which the clock frequency of the time base 14 is changed is selected such that there is a sufficiently large number of steps in the range between the maximum value 48 and the minimum value 49 of the clock frequency. The error variable is obtained for the method from the superimposition of the frequency offset of the clock of the time base 14 and the DTV. Since the frequency offset of the clock is very low owing to the use of highly stable oscillators with $\Delta f \leq 200$ ppm, the individual value of the error variable is determined essentially by means of the DTV. However, owing to the fact that the ATM cells on the transmitter side are fed with a constant cell rate, the influence of said error variable is eliminated by means of the relation $\Sigma DTV_i=0$ over relatively long time periods. The magnitude of the steps by which the clock frequency of the time base 14 is changed is therefore oriented toward the possible frequency offset of the clock and is not aimed at compensating the error variable $t_R$ to 0 during the outputting of an ATM cell. Therefore, an integrated controller which evaluates the sign curve produces better control characteristics than a proportional controller which would correct the DTV.

If the transfer of the ATM cells to the input buffer 6 takes place by means of a UTOPIA (Universal Test and operations Physical Interface for ATM), the time $T_S$ can be derived from the SOC (Start of Cell) signal. The delay time $t_V$ can be set very low and does not cause a plurality of cells to be received, as is the case with the ACR method. It is a condition that the delay time $t_V$ is definitely longer than the variation in the interval between two received cells (Transmission Delay Time Variation) occurring in the physical ATM network. In an ATM network in which the switching and transmission capacities are not utilized up to the limit values, this variation is small. In the case of a physical application, the conditions are, for example, such that the variation is smaller than the outputting time for an ATM cell, so that the outputting can start even before a second ATM cell has been input.

An acceptable disadvantage of this method is that the sequence of time stamps $T_S$ generated on the receive side has the DTV superimposed on it. However, the control circuit therefore corrects the clock frequency of the time base 14 in accordance with the DTV. Therefore, the actual frequency curve 50 has a fluctuation which is due to the DTV. In contrast with this, the SRTS method is not influenced by the DTV. However, control-related fluctuations in the actual frequency curve occur here too, since the RTS is subject to a digital residual error. This also leads, as an instantaneous value, to a correction procedure and is only averaged out over a certain number of transmissions.

While a specific embodiment of the invention has been shown and described in detail to illustrate the application of the principles of the invention, it will be understood that the invention may be embodied otherwise with out departing from such principles.

What is claimed is:

1. A method for synchronizing transmissions at a constant bit rate in asynchronous transfer mode (ATM) networks, the method comprising:

converting a data stream at a constant bit rate on a transmitter side into an ATM cell stream by an interworking unit;

providing a receiving device comprising an input buffer, a receiving device interworking unit, a time base and a controller;

storing ATM cells, on the receive side, in the input buffer after transmission;

assigning the ATM cells, in the input buffer, a time stamp $T_S$ which correlates with the time of its reception;

forming a data stream of data stored in the ATM cells, at a constant bit rate, with the receiving device interworking unit, at a time $T_A$, delayed with respect to the reception time;

prescribing a desired delay time value $t_V$ for a delay time, said desired value $t_V$ being greater than a variation of the transmission time delay time variation (DTV) of the ATM cells from the transmitter to the receiver;

determining an actual delay time by forming the difference $T_A-T_S$;

producing an error variable $t_R=t_V-(T_A-T_S)$ and transferring the error variable to said controller;

generating a correcting variable at the controller from the error variable $t_R$;

transferring the correcting variable to said time base; and adjusting a clock frequency of said time base according to said correcting variable, counter to a deviation.

2. The method as claimed in claim 1, wherein said controller is designed as an integrating controller.

3. The method as claimed in claim 2, wherein the controller derives the sign value from the error variable $t_R$ and adjusts the clock frequency of the time base (14) in accordance with $\Delta f=-k\Sigma(SIG_{TA(i)})$.

4. A receiver station for asynchronous transfer mode (ATM) networks, comprising:

an input buffer with an output and an input;

an interworking unit with an input and an output, said output of said input buffer being connected to said input of the interworking unit;

a time base having an input and a first output, second output and a third output;

a desired/actual value comparator having a first input, a second input and an output, said output of said interworking unit being connected to said first input of said desired/actual value comparator;

a controller with an input and an output, said output of said desired/actual value comparator being connected to said input of said controller, said output of said controller being connected to said input of said time base and said first output of said time base being connected to said input of said interworking unit, a second output of said time base being connected to said input of the input buffer and said third output of said time base being connected to said second input of said desired/actual value comparator.

5. The receiver station as claimed in claim 4, wherein said controller is an integrating controller.

6. An asynchronous transfer mode (ATM) network system, comprising:

a transmitting side interworking unit for converting a data stream at a constant bit rate on a transmitter side into an ATM cell stream;

an input buffer with an output and an input, said input buffer storing ATM cells, on the receiving side after transmission;

a receiving side interworking unit with an input and an output, said output of said input buffer being connected to said input of the interworking unit, said receiving side interworking unit forming a data stream of data stored in the ATM cells, at a constant bit rate, with the receiving device interworking unit, at a time $T_A$, delayed with respect to the reception time;

a time base having an input and a first output and a second output, said time base assigning the ATM cells, in the input buffer, a time stamp $T_S$ which correlates with the time of its reception;

a desired/actual value comparator having a first input, a second input and an output, said output of said interworking unit being connected to said first input of said desired/actual value comparator, said comparator prescribing a desired delay time value $t_V$ for the delay time, said desired value $t_V$ being greater than a variation of the transmission time delay time variation (DTV) of the ATM cells from the transmitter to the receiver, said comparator determining an actual delay time by forming the difference $T_A-T_S$ and producing an error variable $t_R=t_V-(T_A-T_S)$;

a controller with an input and an output, said output of said desired/actual value comparator being connected to said input of said controller, said output of said controller being connected to said input of said time base and said output of said time base being connected to said input of said interworking unit, a second output of said time base being connected to said input of the input buffer and said third output of said time base being connected to said second input of said desired/ actual value comparator, said controller generating a correcting variable at the controller from the error variable $t_R$, said time base receiving said correcting variable and a clock frequency of said time base is adjusted according to said correcting variable, counter to a delay deviation.

* * * * *